United States Patent
Unger

(10) Patent No.: US 6,596,171 B2
(45) Date of Patent: Jul. 22, 2003

(54) ENHANCED ACTIVATED SLUDGE TREATMENT

(76) Inventor: Michael T. Unger, 6514 Forest Ave., Hammond, IN (US) 46324

( * ) Notice: Subject to any disclaimer, the term of this patent is extended or adjusted under 35 U.S.C. 154(b) by 42 days.

(21) Appl. No.: 09/834,034

(22) Filed: Apr. 10, 2001

(65) Prior Publication Data

US 2002/0144945 A1 Oct. 10, 2002

(51) Int. Cl.$^7$ ................................................ C02F 3/00
(52) U.S. Cl. ...................................... 210/626; 210/614
(58) Field of Search .............................. 210/605, 607, 210/613, 614, 620, 621, 622, 623, 624, 625, 626

(56) References Cited

U.S. PATENT DOCUMENTS

| | | |
|---|---|---|
| 2,517,792 A | 8/1950 | Kraus |
| 4,263,137 A | 4/1981 | Kos |
| 5,128,040 A | 7/1992 | Molof et al. |
| 5,160,043 A | 11/1992 | Kos |
| 5,213,681 A | 5/1993 | Kos |
| 5,651,891 A | 7/1997 | Molof et al. |
| 5,733,455 A | 3/1998 | Molof et al. |
| 5,811,009 A | 9/1998 | Kos |
| 5,853,588 A | 12/1998 | Molof et al. |
| 6,113,788 A | 9/2000 | Molof et al. |

OTHER PUBLICATIONS

Operations Forum, vol. 16, No. 1—Jan. 1999 Face the Future Easier to Digest–pp. 20–23 Richard Sutton and Michael T. Unger.

P/PM Technology Condition–Based Maintenance Improves Gas Compressor Reliability—pp. 20 23 Richard Sutton P.E. and Michael T. Unger PhD., Sanitary District of Hammond.

Innovative Respirometry at the Sanitary District of Hammond Presented at the 62nd Annual Conference of the Indiana Water Pollution Control Association—Nov. 16–18, 1998 Michael T. Unger, Ph.D. and Prasad S. Kodukula, Ph.D.

Operations Forum—vol. 15, No. 1–Jan. 1998 Water Environment Federation An Overworked Municipal Plant Teams up with a Manufacturer to end Pump Failures—pp. 15–18 Nick Kiefer.

Selector Channel Evaluation and Optimization at the Hammond Wastewater Treatment Plant by Michael T. Unger, Ph D., Richard Sutton, P.E., Daniel K. Cha, Ph D.—Nov. 13, 1995.

Water World—Jan. 1999 TMDL Rules Drive Water Monitoring.

Article taken from *Journal WPCF*—Oct. 1961, *The Anaerobic Contact Process In Practice*, by Edwin B. Fall, Jr., & L.S. Kraus.

(List continued on next page.)

*Primary Examiner*—Chester T. Barry
(74) *Attorney, Agent, or Firm*—Niro, Scavone, Haller & Niro

(57) ABSTRACT

An enhanced activated sludge wastewater treatment method increases volumetric pollutant loading, hydraulic loading capacity and nutrient removal efficiency at a conventional activated sludge wastewater treatment plant. The method describes the control of return activated sludge rates, and the operation of partitioned aeration and reaeration zones according to measured properties of the mixed liquor to achieve the claimed benefits. Operating an existing treatment plant according to the enhanced treatment method provides a more consistent treatment process that is resistant to shock loading and increases plant capacity without the need for costly construction and operation of additional reactors and clarifiers.

48 Claims, 6 Drawing Sheets

OTHER PUBLICATIONS

Article taken from *Journal WPCF*—Nov. 1961, *Sampling Devices Used In The Anaerobic Contact Process*, by Edwin B. Fall, Jr., & L. S. Kraus.

Article taken from *Sewage Works Journal*—Jan. 1939, *Concentrating Activated Sludge With A Continuous Feed Centrifuge*, by L. S. Kraus & J.R. Longley.

Article taken from *Sewage & Industrial Wastes*—Dec. 1955, *Dual Aeration As A Rugged Activated Sludge Process*, by L.S. Kraus.

Article taken from *Sewage & Industrial Wastes*—Feb. 1958, *Combined Treatment Of Industrial And Domestic Wastes*, by L. S. Kraus.

Article taken from *Sewage Works Journal*—Jul. 1949, *Quantitative Relationships In The Activated Sludge Process*, by L.S. Kraus.

Article taken from *Sewage Works Journal*—Jul. 1937, *The Disposal of Sludge & Gas—By Products Of Sewage Treatment*, by L.S. Kraus.

Article taken from *Sewage Works Journal*—Jul. 1942, *Riboflavin In Sewage Sludge*, by L.S. Kraus.

Articles taken from *Sewage Works Journal*—May 1941, *The Maintenance Of Sewage Treatment Works Equipment*, by L.S.Kraus.

Articles taken from *Sewage Works Journal*—Jul. 1937, *Sludge Disposal At The Chicago West Side Works*, by C.V. Erickson.

Articles taken from *Sewage Works Journal*—Jul. 1933, *Plant Operation—Sludge Digestion at Peoria, Illinois*, by Leon S. Kraus.

Articles taken from *Sewage Works Journal*—Jan. 1942, *Discussion*, by L.S. Kraus.

Article taken from *Sewage Works Journal*—Nov. 1945, *Research—The Use Of Digested Sludge & Digester Overflow To Control Bulking Activated Sludge*, by L.S. Kraus.

Article taken from *Sewage Works Journal*—Nov. 1946, *Digested Sludge—An Aid To The Activated Sludge Process*, by L.C. Kraus.

Article taken from *Journal WPCF*—May 1965, *Operating Practices For Activated Sludge Plants*, by L.S. Kraus.

Article taken from *Wastes Engineering*—Oct. 1959, *The Big Clean–Up*, by Donnelley Publication.

/ TOTAL RAW FLOW   /RAS FLOW

FIG. 8

|  | CONVENTIONAL SINGLE STAGE NITRIFICATION | INVENTION |
|---|---|---|
| HYDRAULIC LOADING | 48 MGD | 72 MGD |
| MASS LOADING | 250,000 lbs. COD/d | 450,000 lbs. COD/d |
| NUTRIENT REMOVAL, N<br>NUTRIENT REMOVAL, P | 70%<br>85% | 90-95%<br>85% |
| SVI | 80-120 | 40-60 |

ENHANCED ACTIVATED SLUDGE TREATMENT

FIELD OF THE INVENTION

The present inventions apply generally to improved methods of wastewater treatment in treatment facilities employing an activated sludge process. More particularly, the inventions are directed to enhancing the secondary treatment process by selected reaeration, recirculation and nitrification techniques that result in improved volumetric loading, hydraulic capacity and nutrient removal over conventional activated sludge treatment techniques.

BACKGROUND OF THE INVENTION

Wastewater generated by municipalities and industries water is commonly collected and routed to a treatment facility for the removal of a variety of physical, chemical and biological pollutants prior to being discharged into a receiving body of water. To effect the necessary treatment, many public and private treatment facilities employ both physical and biological treatment methods. Physical methods—including screening, grinding and physical setting processes—are effective for the removal of larger and heavier solids in the wastewater. However, lighter, smaller solids and other soluble pollutants in the wastewater resist removal by physical methods. For these pollutants, biological treatment methods such as activated sludge and trickling filters are commonly employed.

In the activated sludge process, settled wastewater is introduced into a reactor where an aerobic microbial culture is maintained in suspension. The culture may include a variety of different strains of bacteria, protozoa and rotifers. The combination of this microbial culture and the wastewater is commonly referred to as mixed liquor. Aeration in the reactor creates an aerobic environment and maintains the mixed liquor in suspension. The microorganisms interact with the wastewater to create a biomass that is more amenable to physical settling. After a specified reaction period, mixed liquor is sent to a settling tank to separate and remove the accumulated solids. A portion of the settled solids is treated further and the remaining portion is returned to the reactor to maintain a specified microbial concentration in the mixed liquor.

A desirable microbial culture will decompose organic pollutants quickly and will form a floc to separate biosolids. Mean cell residence time (MCRT) is the average time the microbes are present to metabolize their food. For typical domestic wastewater, the mean cell residence time generally falls within the range of five to fifteen days. Within these limits the beneficial treatment qualities of the floc generally improve with increased residence time. There is a direct relationship between mean cell residence time and effluent waste concentration.

Effluent discharges from wastewater treatment works must meet certain water quality limitations for selected pollutant parameters which are specified in discharge permits issued in accordance with the National Pollution Discharge Elimination System (NPDES). In order to meet the permitted effluent limits, wastewater treatment facilities are designed for a specified peak hydraulic capacity and a peak volumetric pollutant loading. The specified peak capacity and loading fix the size of the treatment facility. Still, in areas of residential or industrial growth, increased water use leads to increased wastewater production that, in turn, leads to increased hydraulic loading. Industrial processes may also produce occasional "shock" loadings of pollutants that may overwhelm the pollutant removal capabilities of the existing biological treatment facilities.

With the conventional activated sludge process, the maximum recommended volumetric pollutant loading rate is 0.6 (kg $BOD_5$ applied/$m^3$-day). Some enhancements to the conventional activated sludge process can increase volumetric pollutant loading without compromising the quality of the effluent. The known processes include enhanced aeration techniques, contact stabilization and Kraus process systems. However, even with known enhancements, there is an upper limit for volumetric loading. For enhancement by the Kraus process, the upper limit is 1.6 (kg $BOD_5$, applied/$m^3$-day)[1]. Modified aeration may raise the limit to 2.4 (kg $BOD_5$, applied/$m^3$-day). Pure oxygen aeration systems may attain a volumetric loading of up to 3.3 (kg $BOD_5$ applied/$m^3$-day), but are rarely used due to high implementation and maintenance costs.

[1] Metcalf & Eddy, Inc. 1979. *Wastewater Engineering*, Second Edition. McGraw Hill.

When pollutant loading or hydraulic capacity limits are reached, treatment facilities face the risk of permit limit violations, the possibility of Federal or State enforcement action, and restrictions or prohibitions on domestic and industrial growth within the service area of the treatment works. Typically, wastewater treatment facilities undergo physical expansion to meet the needs of increased hydraulic loading. But, physical expansion is expensive and often requires additional land that may not be available adjacent to existing facilities.

Therefore, it is desirable to find a way to increase volumetric pollutant loading and hydraulic capacity without the need for physical plant expansion. A significant advantage of the present invention over prior art methods of enhanced activated sludge processes is that volumetric pollutant loading can be substantially increased with only minor modifications to existing physical facilities. In addition, it is also a feature and advantage of the present invention that the enhanced activated sludge process produces a sludge with improved settling characteristics. Improved settling characteristics allow increases in hydraulic loading without requiring an increase in the size of the physical elements of the activated sludge system. By the same token, new activated sludge treatment works can be constructed in smaller sizes and at lower costs than known systems. With the enhanced activated sludge process of the present invention, design parameters that reflect the increased hydraulic capacity and pollutant loading capability can be incorporated into the sizing of the required structural elements to reduce the construction cost of new treatment works.

Most operators of wastewater treatment facilities have little or no control over the quality of the influent coming to the treatment plant they operate. Variations in domestic and industrial water use necessarily give rise to hourly, daily and seasonal fluctuations in influent wastewater quality. In particular, certain industrial events can result in the discharge of a "shock" pollutant load into the wastewater collection system and ultimately into the treatment plant. Such shock loading can upset the balance of the microbial culture present in the activated sludge reactor with a resulting loss of wastewater treatment effectiveness. Shock loading events also raise the risk of violating NPDES permit limitations on effluent quality with corresponding potential penalties and fines. It is another advantage of the present invention that the enhanced activated sludge process offers improved resistance to upsets of the microbial culture. It is also a feature and an advantage of the present invention that operating conditions of the activated sludge reactor are maintained in a more uniform condition, more resistant to undesirable variation in influent water quality changes.

For the activated sludge process to function properly, certain nutrients must be available in adequate amounts. The principal nutrients are nitrogen and phosphorus. While these nutrients are necessary for wastewater treatment, they may cause problems for aquatic life in the receiving waters where the treated effluent is discharged. Accordingly, the concentration of these nutrients in wastewater effluent is often limited by the NPDES discharge permit of the treatment facility. In these situations wastewater treatment facilities must include nutrient removal as part of the overall treatment process. In some cases the influent is nutrient deficient, requiring both the addition of nutrients and their subsequent removal. It is known in the art that nutrients may be added into the activated sludge process by chemical addition or, if digesters are present at the treatment works, by the recycling of digester supernatant.

Nutrient removal may be accomplished by any one of many suspended growth and attached growth processes that are known in the art. However, these systems often require the construction and operation of additional reactors and clarifiers, adding substantially to the cost of wastewater treatment. Therefore, it is a feature of the present invention that the enhanced activated sludge process can provide effective nutrient removal without the construction of separate nutrient removal reactors.

BRIEF DESCRIPTION OF THE DRAWINGS

FIG. 8 is an exemplary comparative table of plant performance factors for volumetric loading, hydraulic loading and nutrient removal during periods before and after implementation of the present invention.

DETAILED DESCRIPTION OF PREFERRED EMBODIMENTS

Set forth below is a description of what is currently believed to be the preferred embodiments or best examples of the claimed inventions. Future and present alternatives and modifications to the preferred embodiments are contemplated. Any alternatives or modifications which make insubstantial changes in function, in purpose, in structure or in result are intended to be covered by the claims of this patent.

Physical Characteristics

Figure 1:
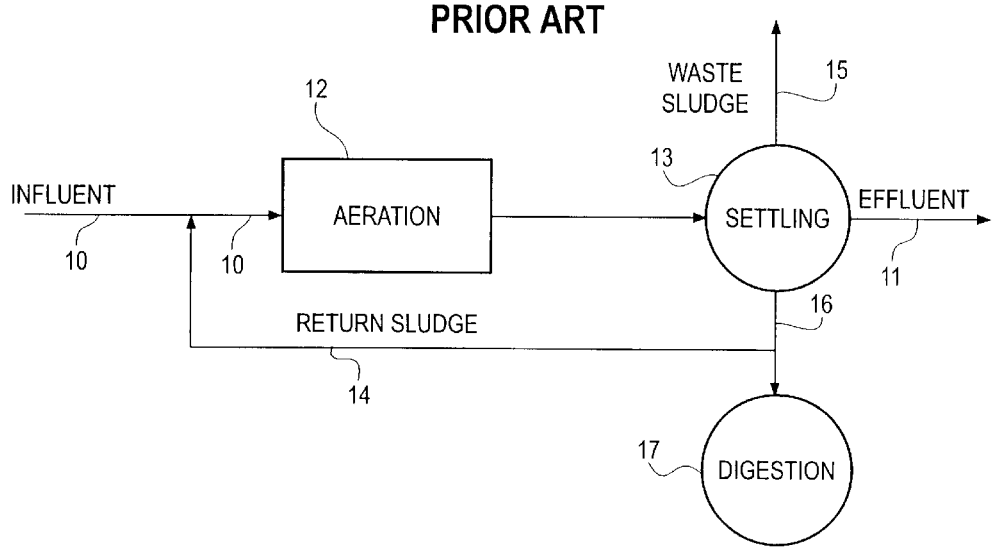
FIG. 1 is a process diagram of a common configuration for a conventional activated sludge treatment facility.

While it is within the understanding of the invention that the claimed treatment processes can be incorporated into the design and construction of new treatment facilities, the best mode of practicing the invention involves the retrofitting of existing treatment works. FIG. 1 depicts a process diagram of a conventional activated sludge treatment system. Commonly, the activated sludge treatment step will be preceded by a physical settling process and may be followed by supplemental treatment prior to discharge at the treatment plant outfall. Therefore the influent 10 refers to the influent stream entering the aeration reactor 12 and the effluent 11 refers to the effluent stream leaving the settling tanks 13. The aeration reactor 12 may be a single basin or may be partitioned into multiple zones to facilitate operation and maintenance. The settling basin 13 may also consist of one or more operating units. Process piping 14, 15, 16 conveys the solids collected from the settling basin to one or more locations. For example, a process line 14 may return activated sludge to the upstream side of the aeration basin 12. Other process lines 15, 16 may route activated sludge to digesters 17 or to a waste process for thickening or disposal. The process lines 14, 15, 16 may include a combination of valves, pumps and automated controls as are known in the art to provide the treatment plant operator with the ability to control the volume of sludge drawn from the settling basin 13 and the portion of the withdrawn sludge that is directed through each process line.

Figure 2:
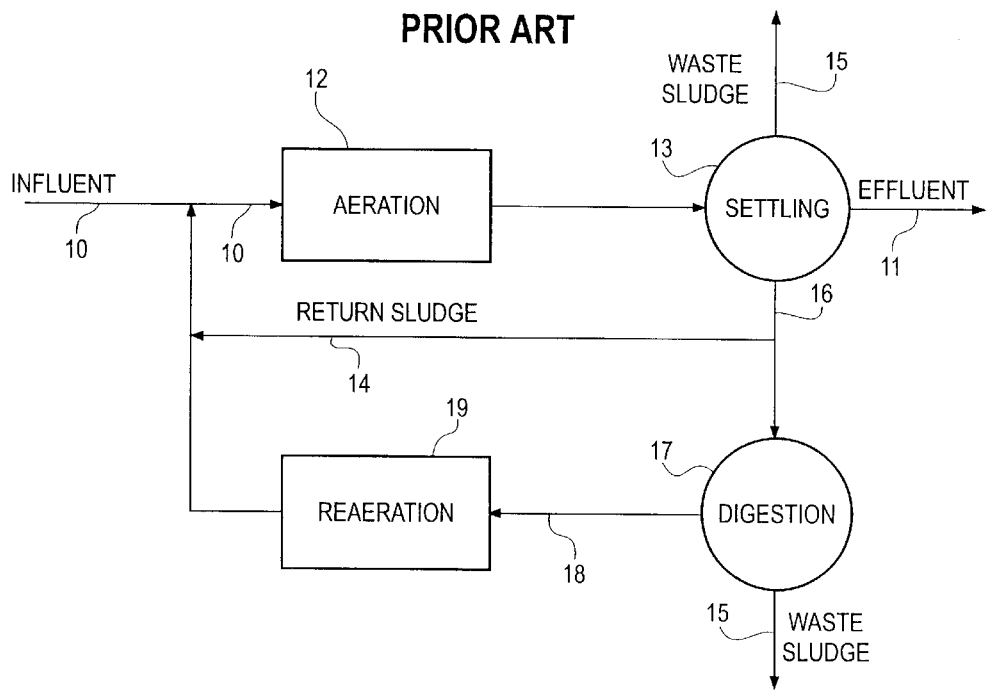
FIG. 2 is a process diagram for a conventional activated sludge treatment facility with a Kraus process modification.

FIG. 2 is a schematic illustrating an activated sludge treatment system that has been modified according to the Kraus process. The Kraus process involves adding one or more process lines 18 to return digester supernatant and, optionally, digested sludge from the digester 17 to the aeration basin 12. The return flow from the digester passes through a reaeration basin 19 prior to being reintroduced to the reactor 12 for the general aeration of the activated sludge.

In order to employ the enhanced activated sludge treatment process of the present invention in an existing conventional activated sludge system, the general aeration reactor 12 should preferably be partitioned into subsets of the total reactor volume. The size and number of partitioned subsets may be dictated by operational convenience or other factors as it is not significant to the result obtained by the present invention. Alternatively, additional basins may be constructed adjacent to the existing aeration basin and hydraulicly connected with associated piping and channels. In this alternative, the collection of separately constructed basins comprise the aeration reactor 12 that is to be partitioned.

Figure 3:
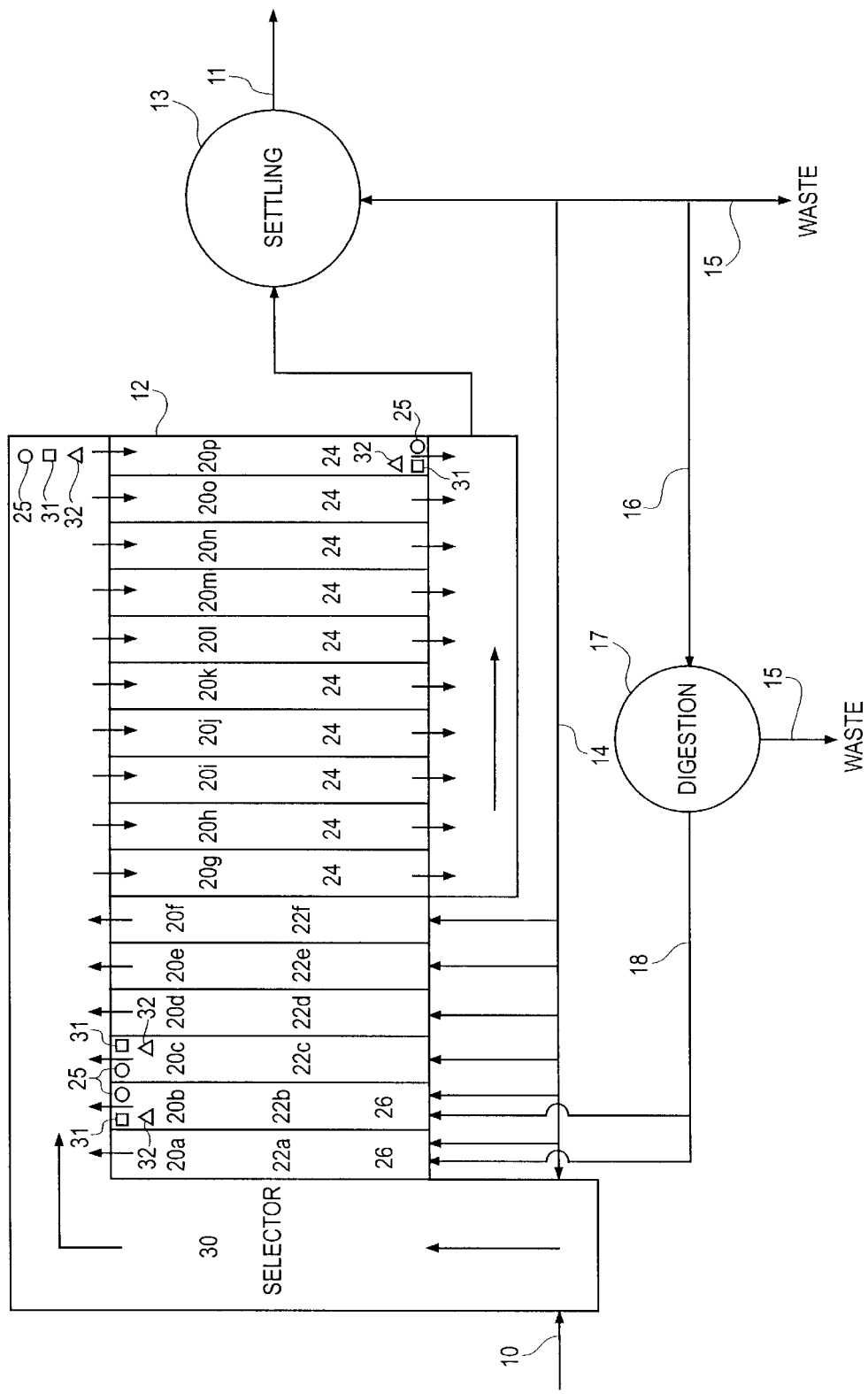
FIG. 3 is a process diagram for an enhanced activated sludge process according to a preferred embodiment of the present invention.

FIG. 3 shows the general aeration basin 12 of a conventional activated sludge treatment process that has been partitioned into sixteen discreet aeration zones 20a–20p of generally equal volume. Aeration equipment, as is known in the art, is present in the aeration zones 20a–20p to transfer oxygen to the mixed liquor. In the preferred embodiment, six of the sixteen aeration zones (37.5% by volume) are removed from the initial general aeration process and reserved for the receipt of return activated sludge (RAS). These six zones are the reaeration zones 22a–22f of the present invention. RAS enters the reaeration zones 22a–22f at the upstream end and exits at the downstream end into the general aeration zones 24. Of the six reaeration zones 22a–22f two (33% by volume) are reserved as Kraus zones 26 for operation according to the Kraus process. In the Kraus zones 26 digester supernatant is combined with the return activated sludge. The contents are reaerated prior to being returned to the general aeration zones 24.

The preferred embodiment also includes a biological selector 30 upstream of the general aeration zones 24 that is normally operated in an anoxic state. When operated in this manner, the dissolved oxygen concentration is typically between 0.0 mg/l and 0.2 mg/l. The biological selector 30 can be operated in oxic, anoxic and anaerobic conditions as desired to stress the biological culture in the selector and promote a desirable sludge type in the aeration phase.

The control of return activated sludge rates, waste activated sludge rates and supernatant addition is regulated in the preferred embodiment by process automation. Readings from respirometers 25, solids meters 31, and on-line RedOx monitors 32 are calibrated against laboratory analyses. Once calibrated, the readings are combined with the results of settleable solids testing to dictate process variable set points (such as flow rates and dissolved oxygen) to achieve overall process control.

Operating Conditions

Figure 4:
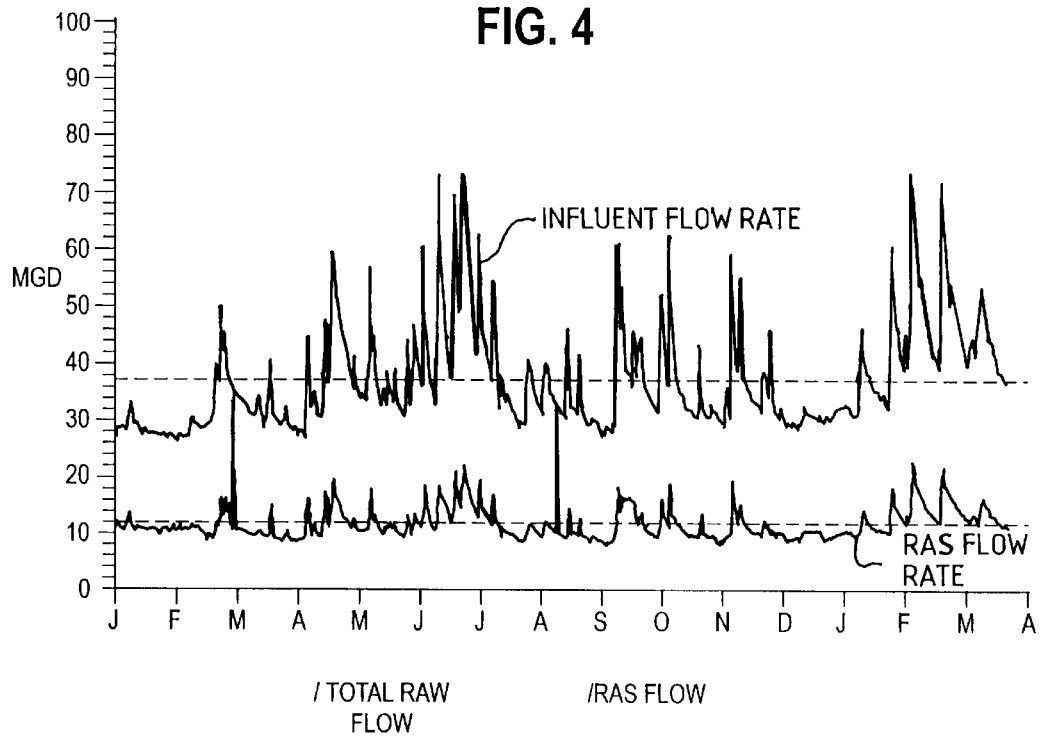
FIG. 4 is a chart illustrating the relationship between influent and return activated sludge (RAS) versus time according to a preferred embodiment of the present invention.

The enhanced activated sludge treatment method of the preferred embodiment involves controlling selected conditions in the aeration phase of the treatment process. First, the return flow rate of activated sludge from the settling basin 13 to the upstream side of the aeration phase is preferably maintained at approximately 30% of the influent 10 to the aeration phase as illustrated in FIG. 4. While the preferred return rate is 30%, the process remains effective for return rates in the range of 25% to 60% of the influent flow rate. The return rate has an inverse correlation to the total suspended solids (TSS) concentration of the RAS. At low sludge return rates, as employed in the preferred embodiment, the solids concentration of the RAS may be as high as 20,000 ppm.

The sludge volume index (SVI) of the mixed liquor in the general aeration phase, as measured from a sample drawn preferably at a point between the aeration phase and the settling phase is an indication of the settling characteristics of the sludge. Generally, the SVI for the present invention can be expected to fall within the range of 40–80. For the preferred embodiment, the expected range is 40–60. Activated sludge return rates on the higher end of the beneficial range are appropriate where the SVI is similarly high.

Figure 5:
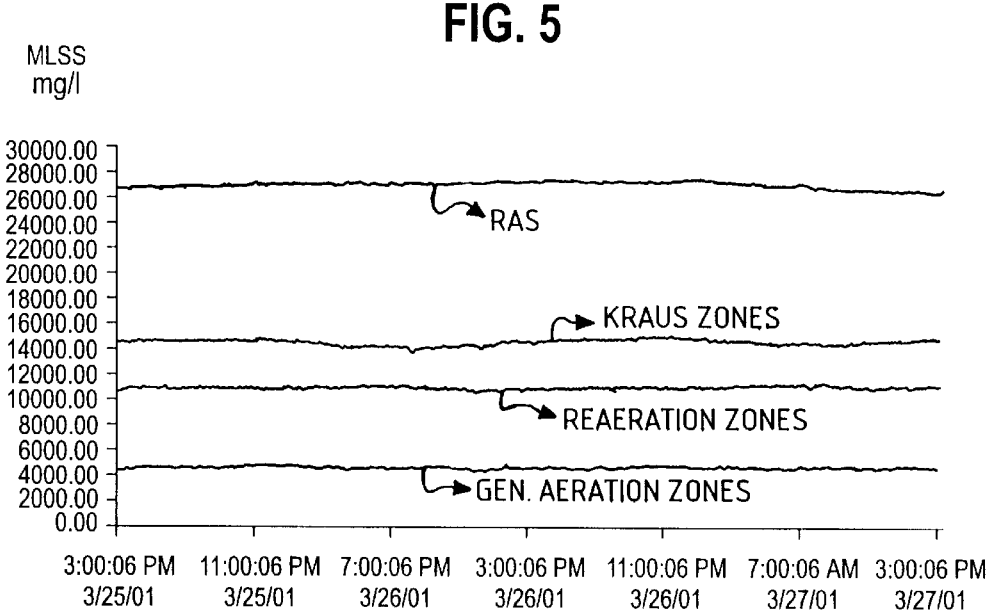
FIG. 5 is a chart illustrating the relationship between mixed liquor suspended solids (MLSS) in the reaeration and general aeration zones versus time according to a preferred embodiment of the present invention.

Limiting the volume of the return activated sludge as described above results in a heavier solids concentration in the return line 14 than in the influent line 10. The additional solids are then retained in the reaeration zones 22a–22f of the aeration phase so that the concentration of mixed liquor suspended solids (MLSS) in the reaeration zones 22a–22f is typically 8,000–12,000 ppm as compared to the concentration of MLSS in the general aeration zones 24 which is typically 3,000–5,000 ppm. In cold weather conditions, the MLSS in the general aeration zones 24 is slightly higher with typical concentrations of 5,000–6,000 ppm. The relationship of solids concentrations in the general aeration zones 24, reaeration zones 22a–22f and return sludge are illustrated in FIG. 5.

Figure 6:
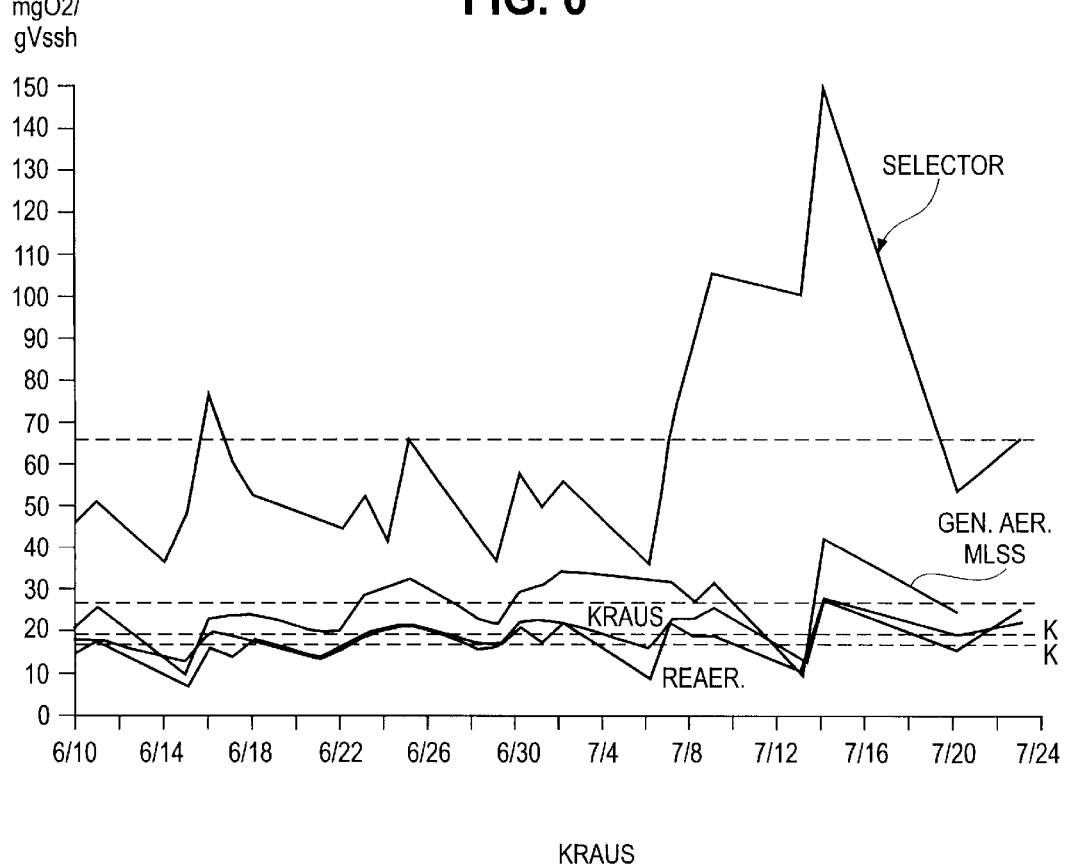
FIG. 6 is a chart illustrating the relationship between respiration rate in the reaeration and general aeration zones versus time according to a preferred embodiment of the present invention.
Figure 7:
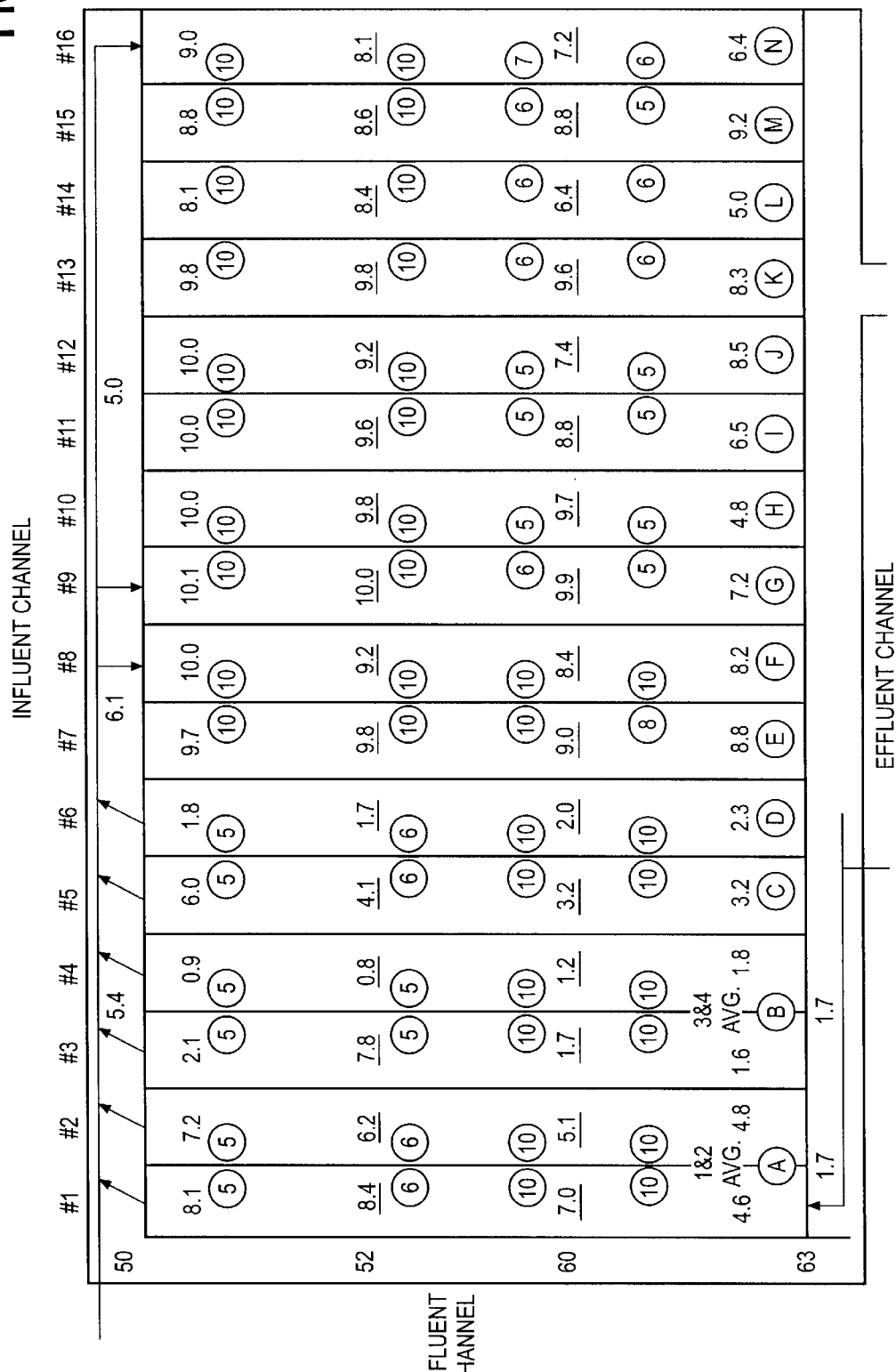
FIG. 7 is a chart illustrating the relationship between dissolved oxygen concentrations in the Kraus and reaeration zones versus time according to a preferred embodiment of the invention.

The respiration rate of the biological culture varies between the selector 30, reaeration zones 22a–22f and the general aeration zones 24 as illustrated in FIG. 6. When operating according to the preferred embodiment, the respiration rate in the reaeration zones 22 is consistently lower than the respiration rate of the general aeration zones 24. The respiration rate, also known as the specific oxygen uptake rate (SOUR) is used an indicator of sludge age. A high SOUR measured in the selector 30 indicates that the sludge age is too low and sludge wasting should be reduced. A low SOUR measured in the general aeration zones 24 indicates that the sludge age is too high and sludge wasting should be increased.

Process controls on the means of aeration, as are known in the art, allow the operator to selectively adjust the concentration of dissolved oxygen (DO) in the reaeration zones 22. In the preferred embodiment, the DO concentration in the mixed liquor at the downstream end of the Kraus zones 26 is typically 1.5 mg/l–3.0 mg/l. If ammonia nitrogen is present in the effluent 12 of the aeration phase, the DO concentration in the Kraus zones 26 is increased. The non-Kraus reaeration zones 22c–22f are operated with the least amount of aeration that is necessary to maintain the solids of the mixed liquor in suspension. Typically, the DO concentration at the downstream end of the reaeration zones 22c–22f is 0.1 mg/l–0.3 mg/l.

The differential aeration between the Kraus zones 26 and the other reaeration zones 22c–22f has the effect of enhancing nitrogen removal. Where conventional, single stage nitrification has a 70% nitrogen removal efficiency, the differential aeration of the preferred embodiment increases the nitrogen removal efficiency to 95%. The desired differential aeration can be expressed as a ratio between the DO concentrations, the downstream ends of the Kraus zones 26 and the other reaeration zones 22c–22f. In the preferred embodiment, that ratio is typically greater than 5:1. Ratios as low as 2:1 are also known to achieve improved nitrogen removal efficiency.

The combination of aeration partitioning, return activated sludge rate control, and differential MLSS concentrations described above create an improved solids type with low and stable SVI. The high MLSS in the reaeration zones 22 provides buffering capacity for shock pollutant loadings that resists typical process upsets and increases the volumetric loading capacity to values as much as six times the maximum loading capacity reported for conventional activated sludge systems with Kraus process modifications. The low and stable SVI produces gains in hydraulic capacity of 50% in the preferred embodiment. The further operation of differential DO concentrations in the reaeration zones 22c–22f and the Kraus zones 26 enhances nutrient removal efficiency. Resulting nutrient removal rates achieved by the enhanced process of the preferred embodiment are typically 0.005 lbs. N/lb. VSS as an annual average and 0.010 lbs. N/lb. VSS during warm weather seasons. The performance factors expected for typical municipal wastewater treatment plants before and after practicing the described method are reported in FIG. 8.

The above description is not intended to limit the meaning of the words used in the following claims that define the invention. Rather, it is contemplated that future modifications in structure, function or result will exist that are not substantial changes and that all such unsubstantial changes in what is claimed are intended to be covered by the claims.

What is claimed is:

1. An activated sludge wastewater treatment process carried out in a wastewater treatment facility including an aeration vessel having a plurality of aeration zones, a settling vessel, and a digestion vessel said process comprising the steps of:

partitioning said aeration vessel so that approximately 20 percent to 45 percent of the volume of the aeration zones is operated as reaeration zones;

returning activated sludge from said settling vessel to said reaeration vessel; the return activated sludge flow rate being less than 60 percent of the wastewater influent flow rate;

aerating activated sludge returned from said settling vessel in said reaeration zones;

adding supernatant from said digestion vessel to said portion of said reaeration zones; and controlling the concentration of mixed liquor suspended solids in said aeration vessel so that the ratio of MLSS between said reaeration zones and the other aeration zones is greater than 1:1;

whereby the process realizes an average influent volumetric loading capacity greater than approximately 3.2 kg $BOD_5/m^3$day.

2. The method of claim 1, further comprising the step of passing at least a portion of said return activated sludge through a biological selector at a location upstream of said aeration zones, wherein an anoxic condition is present in said selector.

3. The method of claim 1, further comprising the step of controlling at least a portion of said return of activated sludge by process automation, said automation based on at least one measurement of a property of the solids in said aeration vessel.

4. An activated sludge wastewater treatment process carried out in a wastewater treatment facility having an aeration vessel having a plurality of aeration zones, a settling vessel and a digestion vessel, said process comprising the steps of:

partitioning aeration vessel so that approximately 20 percent to 45 percent of the volume of the aeration zones is operated as reaeration zones;

aerating activated sludge returned from said settling vessel in a portion of said reaeration zones;

adding a portion of the supernatant from said digestion vessel to said portion of said reaeration zones;

controlling the concentration of dissolved oxygen in said aeration vessel so that the typical concentration of dissolved oxygen at the downstream end of said portion of said reaeration zones is generally at least three times the concentration of dissolved oxygen at the downstream end of the other of said reaeration zones;

returning activated sludge from said settling vessel to the upstream portion of said aeration vessel; the return activated sludge flow rate being less than 60 percent of the wastewater influent flow rate; and controlling the concentration of mixed liquor suspended solids in said aeration vessel so that the ratio of MLSS between said reaeration zones and said other aeration zones is greater than 1:1;

whereby the process realizes an average influent volumetric loading capacity greater than approximately 3.2 kg $BOD_5/m^3$day and an average nutrient removal rate greater than 0.005 lbs nitrogen per lb volatile suspended solids.

5. The method of claim 4, further comprising the step of passing at least a portion of said return activated sludge through a biological selector at a location upstream of said aeration zones, wherein an anoxic condition is present in said selector.

6. The method of claim 4, further comprising the step of controlling at least a portion of said return of activated sludge by process automation, said automation based on at least one measurement of a property of the solids in said aeration vessel.

7. A process for the treatment of wastewater comprising:

combining an influent wastewater stream and an activated sludge in a primary aeration reactor thereby creating an aerated mixed liquor;

transferring said aerated mixed liquor to a settling basin and withdrawing from said settling basin an effluent stream and an activated sludge stream;

transferring a portion of said activated sludge stream to a first reaeration reactor thereby generating a first reaeration liquor which is returned to said primary aeration reactor, said first reaeration reactor in fluid communication with said primary aeration reactor;

transferring a portion of said activated sludge stream to a second reaeration reactor thereby generating a second reaeration liquor which is returned to said primary aeration reactor said second reaeration reactor in fluid communication with said primary aeration reactor;

transferring a portion of said activated sludge stream to said primary aeration reactor;

transferring a portion of said activated sludge stream to a digestion phase; and transferring a portion of the contents from said digestion phase to said second reaeration reactor.

8. The wastewater treatment process of claim 7:

wherein the flow rate of said activated sludge stream is less than 60 percent of the flow rate of said influent wastewater stream; and wherein the combined volume of said first and second reaeration reactors is within a range of about 20 percent to about 45 percent of the volumetric sum of said primary aeration reactor and said reaeration reactors.

9. The wastewater treatment process of claim 8:

wherein the mixed liquor suspended solids concentration of said aerated mixed liquor is within a range of 3,000 parts per million to 6,000 parts per million; and wherein the contents of at least one of said first and second reaeration reactors has a mixed liquor suspended solids concentration greater than the mixed liquor suspended solids concentration of said aerated mixed liquor.

10. The wastewater treatment process of claim 9:

wherein the process realizes an average influent volumetric loading capacity greater than approximately 3.2 kg $BOD_5/m^3$ day.

11. The wastewater treatment process of claim 7:

wherein the mixed liquor suspended solids concentration of said aerated mixed liquor is within a range of 3,000 parts per million to 6,000 parts per million; and wherein the contents of at least one of said first and second reaeration reactors has a mixed liquor suspended solids concentration greater than the mixed liquor suspended solids concentration of said aerated mixed liquor.

12. The wastewater treatment process of claim 11:

wherein the process realizes an average influent volumetric loading capacity greater than approximately 3.2 kg $BOD_5/m^3$ day.

13. A process for the treatment of wastewater comprising:

combining an influent wastewater stream and an activated sludge in a primary aeration reactor thereby creating an aerated mixed liquor;

transferring said aerated mixed liquor to a settling basin and withdrawing from said settling basin an effluent stream and an activated sludge stream;

transferring a portion of said activated sludge stream to a first reaeration reactor thereby generating a first reaeration liquor which is returned to said primary aeration reactor, said first reaeration reactor in fluid communication with said primary aeration reactor;

transferring a portion of said activated sludge stream to a second reaeration reactor thereby generating a second reaeration liquor which is returned to said primary aeration reactor said second reaeration reactor in fluid communication with said primary aeration reactor;

transferring a portion of said activated sludge stream to said primary aeration reactor;

transferring a portion of said activated sludge stream to a digestion phase; and transferring a portion of the contents from said digestion phase to said second reaeration reactor;

wherein the flow rate of said activated sludge stream is between 20 percent and about 60 percent of the flow rate of said influent wastewater stream.

14. The wastewater treatment process of claim 13:

wherein the combined volume of said first and second reaeration reactors is within a range of about 20 percent to about 45 percent of the volumetric sum of said primary aeration reactor and said aeration reactors.

15. The wastewater treatment process of claim 14:

wherein the mixed liquor suspended solids concentration of said aerated mixed liquor is within a range of 3,000 parts per million to 6,000 parts per million; and wherein the contents of at least one of said first and second reaeration reactors has a mixed liquor suspended solids concentration greater than the mixed liquor suspended solids concentration of said aerated mixed liquor.

16. The wastewater treatment process of claim 24:

wherein the process realizes an average influent volumetric loading capacity greater than approximately 3.2 kg $BOD_5/m^3$ day.

17. The wastewater treatment process of claim 13:

wherein the mixed liquor suspended solids concentration of said aerated mixed liquor is within a range of 3,000 parts per million to 6,000 parts per million; and wherein the contents of at least one of said first and second reaeration reactors has a mixed liquor suspended solids concentration greater than the mixed liquor suspended solids concentration of said aerated mixed liquor.

18. The wastewater treatment process of claim 17:

wherein the process realizes an average influent volumetric loading capacity greater than approximately 3.2 kg $BOD_5/m^3$ day.

19. A process for the treatment of wastewater comprising:

combining an influent wastewater stream and an activated sludge in a primary aeration reactor thereby creating an aerated mixed liquor;

transferring said aerated mixed liquor to a settling basin and withdrawing from said settling basin an effluent stream and an activated sludge stream;

transferring a portion of said activated sludge stream to a first reaeration reactor thereby generating a first reaeration liquor which is returned to said primary aeration reactor, said first reaeration reactor in fluid communication with said primary aeration reactor;

transferring a portion of said activated sludge stream to a second reaeration reactor thereby generating a second reaeration liquor which is returned to said primary aeration reactor said second reaeration reactor in fluid communication with said primary aeration reactor;

transferring a portion of said activated sludge stream to said primary aeration reactor;

transferring a portion of said activated sludge stream to a digestion phase; and transferring a portion of the contents from said digestion phase to said second reaeration reactor;

wherein the combined volume of said first and second reaeration reactors is within a range of about 20 percent to about 45 percent of the volumetric sum of said primary aeration reactor and said reaeration reactors.

20. The wastewater treatment process of claim 19:

wherein the flow rate of said activated sludge stream is less than 60 percent of the flow rate of said influent wastewater stream.

21. The wastewater treatment process of claim 20:

wherein the mixed liquor suspended solids concentration of said aerated mixed liquor is within a range of 3,000 parts per million to 6,000 parts per million; and wherein the contents of at least one of said first and second reaeration reactors has a mixed liquor suspended solids concentration greater than the mixed liquor suspended solids concentration of said aerated mixed liquor.

22. The wastewater treatment process of claim 21:

wherein the process realizes an average influent volumetric loading capacity greater than approximately 3.2 kg $BOD_5/m^3$ day.

23. The wastewater treatment process of claim 19:

wherein the mixed liquor suspended solids concentration of said aerated mixed liquor is within a range of 3,000 parts per million to 6,000 parts per million; and wherein the contents of at least one of said first and second reaeration reactors has a mixed liquor suspended solids concentration greater than the mixed liquor suspended solids concentration of said aerated mixed liquor.

24. The wastewater treatment process of claim 23:

wherein the process realizes an average influent volumetric loading capacity greater than approximately 3.2 kg $BOD_5/m^3$ day.

25. A process for the treatment of wastewater comprising:

combining an influent wastewater stream and an activated sludge in a primary aeration reactor thereby creating an aerated mixed liquor;

transferring said aerated mixed liquor to a settling basin and withdrawing from said settling basin an effluent stream and an activated sludge stream;

transferring a portion of said activated sludge stream to a first reaeration reactor thereby generating a first reaeration liquor which is returned to said primary aeration reactor, said first reaeration reactor in fluid communication with said primary aeration reactor;

transferring a portion of said activated sludge stream to a second reaeration reactor thereby generating a second reaeration liquor which is returned to said primary aeration reactor said second reaeration reactor in fluid communication with said primary aeration reactor;

transferring a portion of said activated sludge stream to said primary aeration reactor;

transferring a portion of said activated sludge stream to a digestion phase; and transferring a portion of the contents from said digestion phase to said second reaeration reactor;

wherein the mixed liquor suspended solids concentration of said aerated mixed liquor is within a range of 3,000 parts per million to 6,000 parts per million.

26. The wastewater treatment process of claim 25:

wherein the flow rate of said activated sludge stream is less than 60 percent of the flow rate of said influent wastewater stream; and wherein the combined volume of said first and second reaeration reactors is within a range of about 20 percent to about 45 percent of the volumetric sum of said primary aeration reactor and said reaeration reactors.

27. The wastewater treatment process of claim 26:
wherein the contents of at least one of said first and second reaeration reactors has a mixed liquor suspended solids concentration greater than the mixed liquor suspended solids concentration of said aerated mixed liquor.

28. The wastewater treatment process of claim 27:
wherein the process realizes an average influent volumetric loading capacity greater than approximately 3.2 kg $BOD_5/m^3$ day.

29. The wastewater treatment process of claim 25:
wherein the contents of at least one of said first and second reaeration reactors has a mixed liquor suspended solids concentration greater than the mixed liquor suspended solids concentration of said aerated mixed liquor.

30. The wastewater treatment process of claim 29:
wherein the process realizes an average influent volumetric loading capacity greater than approximately 3.2 kg $BOD_5/m^3$ day.

31. A process for the treatment of wastewater comprising:
combining an influent wastewater stream and an activated sludge in a primary aeration reactor thereby creating an aerated mixed liquor;
transferring said aerated mixed liquor to a settling basin and withdrawing from said settling basin an effluent stream and an activated sludge stream;
transferring a portion of said activated sludge stream to a first reaeration reactor thereby generating a first reaeration liquor which is returned to said primary aeration reactor, said first reaeration reactor in fluid communication with said primary aeration reactor;
transferring a portion of said activated sludge stream to a second reaeration reactor thereby generating a second reaeration liquor which is returned to said primary aeration reactor said second reaeration reactor in fluid communication with said primary aeration reactor;
transferring a portion of said activated sludge stream to said primary aeration reactor;
transferring a portion of said activated sludge stream to a digestion phase; and
transferring a portion of the contents from said digestion phase to said second reaeration reactor;
wherein the contents of at least one of said first and second reaeration reactors has a mixed liquor suspended solids concentration greater than the mixed liquor suspended solids concentration of said aerated mixed liquor.

32. The wastewater treatment process of claim 31:
wherein the flow rate of said activated sludge stream is between 20 percent and 60 percent of the flow rate of said influent wastewater stream; and
wherein the combined volume of said first and second reaeration reactors is within a range of about 20 percent to about 45 percent of the volumetric sum of said primary aeration reactor and said reaeration reactors.

33. The wastewater treatment process of claim 32:
wherein the mixed liquor suspended solids concentration of said aerated mixed liquor is within a range of 3,000 parts per million to 6,000 parts per million.

34. The wastewater treatment process of claim 33:
wherein the process realizes an average influent volumetric loading capacity greater than approximately 3.2 kg $BOD_5/m^3$ day.

35. The wastewater treatment process of claim 31:
wherein the mixed liquor suspended solids concentration of said aerated mixed liquor is within a range of 3,000 parts per million to 6,000 parts per million.

36. The wastewater treatment process of claim 35:
wherein the process realizes an average influent volumetric loading capacity greater than approximately 3.2 kg $BOD_5/m^3$ day.

37. A process for the treatment of wastewater comprising:
combining an influent wastewater stream and an activated sludge in a primary aeration reactor thereby creating an aerated mixed liquor;
transferring said aerated mixed liquor to a settling basin and withdrawing from said settling basin an effluent stream and an activated sludge stream;
transferring a portion of said activated sludge stream to a first reaeration reactor thereby generating a first reaeration liquor which is returned to said primary aeration reactor, said first reaeration reactor in fluid communication with said primary aeration reactor;
transferring a portion of said activated sludge stream to a second reaeration reactor thereby generating a second reaeration liquor which is returned to said primary aeration reactor said second reaeration reactor in fluid communication with said primary aeration reactor;
transferring a portion of said activated sludge stream to said primary aeration reactor;
transferring a portion of said activated sludge stream to a digestion phase; and
transferring a portion of the contents from said digestion phase to said second reaeration reactor;
wherein the process realizes an average influent volumetric loading capacity greater than approximately 3.2 kg $BOD_5/m^3$ day.

38. The wastewater treatment process of claim 37:
wherein the flow rate of said activated sludge stream is between 20 percent and 60 percent of the flow rate of said influent wastewater stream; and
wherein the combined volume of said first and second reaeration reactors is within a range of about 20 percent to about 45 percent of the volumetric sum of said primary aeration reactor and said reaeration reactors.

39. The wastewater treatment process of claim 38:
wherein the mixed liquor suspended solids concentration of said aerated mixed liquor is within a range of 3,000 parts per million to 6,000 parts per million; and
wherein the contents of at least one of said first and second reaeration reactors has a mixed liquor suspended solids concentration greater than the mixed liquor suspended solids concentration of said aerated mixed liquor.

40. The wastewater treatment process of claim 37:
wherein the mixed liquor suspended solids concentration of said aerated mixed liquor is within a range of 3,000 parts per million to 6,000 parts per million; and
wherein the contents of at least one of said first and second reaeration reactors has a mixed liquor suspended solids concentration greater than the mixed liquor suspended solids concentration of said aerated mixed liquor.

41. A process for the treatment of wastewater comprising:
combining an influent wastewater stream and an activated sludge in a primary aeration reactor thereby creating an aerated mixed liquor;

transferring said aerated mixed liquor to a settling basin and withdrawing from said settling basin an effluent stream and an activated sludge stream;

transferring a portion of said activated sludge stream to a first reaeration reactor thereby generating a first reaeration liquor which is returned to said primary aeration reactor, said first reaeration reactor in fluid communication with said primary aeration reactor;

transferring a portion of said activated sludge stream to a second reaeration reactor thereby generating a second reaeration liquor which is returned to said primary aeration reactor said second reaeration reactor in fluid communication with said primary aeration reactor;

transferring a portion of said activated sludge stream to said primary aeration reactor;

transferring a portion of said activated sludge stream to a digestion phase; and transferring a portion of the contents from said digestion phase to said second reaeration reactor;

wherein the concentration of dissolved oxygen at the downstream end of said second reaeration zone is at least three times the concentration of dissolved oxygen at the downstream end of said first reaeration zone.

42. The wastewater treatment process of claim 41:

wherein the flow rate of said activated sludge stream is between 20 percent and 60 percent of the flow rate of said influent wastewater stream; and wherein the combined volume of said first and second reaeration reactors is within a range of about 20 percent to about 45 percent of the volumetric sum of said primary aeration reactor and said reaeration reactors.

43. The wastewater treatment process of claim 42:

wherein the mixed liquor suspended solids concentration of said aerated mixed liquor is within a range of 3,000 parts per million to 6,000 parts per million; and wherein the contents of at least one of said first and second reaeration reactors has a mixed liquor suspended solids concentration greater than the mixed liquor suspended solids concentration of said aerated mixed liquor.

44. The wastewater treatment process of claim 43:

wherein the process realizes an average nutrient removal rate greater than 0.005 lbs nitrogen per lb volatile suspended solids.

45. The wastewater treatment process of claim 44:

wherein the process realizes an average influent volumetric loading capacity greater than approximately 3.2 kg $BOD_5/m^3$ day.

46. The wastewater treatment process of claim 41:

wherein the mixed liquor suspended solids concentration of said aerated mixed liquor is within a range of 3,000 parts per million to 6,000 parts per million; and wherein the contents of at least one of said first and second reaeration reactors has a mixed liquor suspended solids concentration greater than the mixed liquor suspended solids concentration of said aerated mixed liquor.

47. The wastewater treatment process of claim 46:

wherein the process realizes an average nutrient removal rate greater than 0.005 lbs nitrogen per lb volatile suspended solids.

48. The wastewater treatment process of claim 47:

wherein the process realizes an average influent volumetric loading capacity greater than approximately 3.2 kg $BOD_5/m^3$ day.

* * * * *

UNITED STATES PATENT AND TRADEMARK OFFICE
CERTIFICATE OF CORRECTION

PATENT NO. : 6,596,171 B2 Page 1 of 1
APPLICATION NO. : 09/834034
DATED : July 22, 2003
INVENTOR(S) : Michael T. Unger It is certified that error appears in the above-identified patent and that said Letters Patent is hereby corrected as shown below:

In claim 16, at

Column 9, Line 24, "The wastewater treatment process of claim 24:" should be changed to --The wastewater treatment process of claim 15:--

Signed and Sealed this

Second Day of October, 2007

JON W. DUDAS
*Director of the United States Patent and Trademark Office*